(12) United States Patent
Bouldin

(10) Patent No.: US 7,845,620 B1
(45) Date of Patent: Dec. 7, 2010

(54) OUTFEED GATE WITH WEAR STRIP ASSEMBLY

(75) Inventor: E. Lloyd Bouldin, McMinnville, TN (US)

(73) Assignee: Bouldin Corporation, McMinnville, TN (US)

( * ) Notice: Subject to any disclaimer, the term of this patent is extended or adjusted under 35 U.S.C. 154(b) by 479 days.

(21) Appl. No.: 11/937,091

(22) Filed: Nov. 8, 2007

Related U.S. Application Data

(60) Provisional application No. 60/875,910, filed on Dec. 20, 2006.

(51) Int. Cl.
*F16K 3/00* (2006.01)
(52) U.S. Cl. .................... 251/328; 251/326; 137/625.25
(58) Field of Classification Search ............... 137/625.2, 137/625.25; 251/326, 327, 328, 329
See application file for complete search history.

(56) References Cited

U.S. PATENT DOCUMENTS

| | | | | |
|---|---|---|---|---|
| 4,838,312 A | * | 6/1989 | Berchem et al. ....... | 137/625.48 |
| 4,867,202 A | * | 9/1989 | Farmer .................. | 137/625.66 |
| 5,069,251 A | * | 12/1991 | Dyer et al. ............. | 137/625.25 |
| 5,938,175 A | * | 8/1999 | Young et al. ................ | 251/329 |
| 6,116,278 A | * | 9/2000 | Baumgardner et al. . | 137/625.25 |
| 2006/0144980 A1 | | 7/2006 | Bouldin .................... | 241/260.1 |

OTHER PUBLICATIONS

Paragraphs [0004]-[0006] of present application, admitted to be prior art.

* cited by examiner

*Primary Examiner*—John K Fristoe, Jr.
(74) *Attorney, Agent, or Firm*—Waddey & Patterson, P.C.; Lucian Wayne Beavers

(57) ABSTRACT

An outfeed gate includes a fixed plate and a sliding plate, wherein bearing strips protect the fixed and sliding plates from excessive wear as they slide over each other. The outfeed gate safely accepts material from a high temperature and pressure environment to an ambient environment, and deposits the material in a material exit apparatus.

20 Claims, 3 Drawing Sheets

OUTFEED GATE WITH WEAR STRIP ASSEMBLY

This application claims benefit of U.S. provisional application Ser. No. 60/875,910, filed Dec. 20, 2006, titled "Outfeed Gate With Wear Strip Assembly".

BACKGROUND OF THE INVENTION

1. Field of the Invention

This invention relates generally to a mechanical gate used in industrial processes. Material is passed through the gate, after which the gate is closed so the material that had passed through can be discharged through a different part of the same gate assembly. After discharging the material, the process is repeated. In particular, this gate is used to safely receive materials from a first process operating at elevated temperatures, elevated pressures, or both to a second process at ambient conditions, without violent or rapid losses of pressure or heat to the second, ambient process.

2. Description of the Prior Art

A system for processing waste uses an infeed assembly; a metamorphic processing apparatus (MPA) held at elevated temperatures, elevated pressures or both; and an outfeed assembly. The outfeed assembly requires an outfeed gate.

The MPA discharges material to the outfeed assembly. The outfeed assembly compacts the material with a compaction ram in a compaction chamber, forming a plug or a block. The outfeed gate allows a portion of the material in the block to pass through an inlet hole into a block forming section, and then the gate is cycled. The cycling of the gate simultaneously cuts the block and closes the compaction chamber. The block is then discharged from the block forming section through a separate outlet hole in the outfeed gate to a material exit apparatus, and the process is repeated.

The outfeed gate is part of the outfeed assembly, which can be used independently from the MPA or the infeed system. The prior art utilizes an outfeed gate comprised of a fixed plate with an inlet and an outlet hole and a sliding plate with a single hole, where the sliding plate directly contacts and slides over the fixed plate. The fixed and sliding plates are made of P20 steel, which is a relatively soft steel, so the sliding action leads to wear on the plates. Furthermore, material from the compaction chamber can become trapped between the fixed and sliding plate, causing scrapes and grooves as the plates slide over each other. The general wear and the grooves lead to leaks between the two plates. This entire system for processing waste is described in U.S. Patent Application Publication Number 2006/0144980, which is incorporated herein by reference.

BRIEF SUMMARY OF THE INVENTION

The outfeed gate of the current invention comprises a fixed plate with both an inlet and an outlet hole, as well as a sliding plate with one hole. The inlet hole of the fixed plate is located within a material supply system, such as a compaction chamber, and the outlet hole is aligned with a material discharge system, such as a bin or auger for collecting the discharged material. The fixed plate inlet hole, fixed plate outlet hole, and the sliding plate hole are all of a similar size and shape. The sliding plate slides across the fixed plate between two positions, wherein the sliding plate hole is aligned with either the inlet or outlet hole of the fixed plate. When the sliding plate hole is aligned with the fixed plate outlet hole, a solid portion of the sliding plate covers and blocks the fixed plate inlet hole. A hydraulic cylinder is used to slide the sliding plate over the fixed plate.

When the sliding plate is covering and blocking the fixed plate inlet hole, the seal has to be secure enough to prevent compacted material at elevated temperatures and pressures from escaping to the ambient conditions on the other side of the outfeed gate. Therefore, the sliding plate has to be pressed firmly against the fixed plate during operation. The friction caused by the sliding plate sliding over the fixed plate, when the two plates are firmly pressed together, causes wear and grooves on the two plates. Pieces of material also become trapped between the fixed and sliding plate, which exacerbates the wear and grooves from the sliding of the two plates. The use of a harder material of construction for the two plates results in an undesirable increase in brittleness. To address the competing issues of wear and unacceptable plate brittleness, the current invention uses wear strips between the fixed plate and the sliding plate.

A first wear strip is attached to the fixed plate, and a second wear strip is attached to the sliding plate. These wear strips can be changed, which facilitates maintenance on the outfeed gate system. Also, harder material can be utilized by the wear strips, because they are attached to and supported by the base plates. The base plates provide the needed durability and flexibility to withstand the impacts the outfeed gate is subjected to. The wear strips can be comprised of multiple bearing surfaces attached to the facing surfaces of the fixed and sliding plates.

Gibs are used to secure the sliding plate to the fixed plate, and to adjust the pressure between them. Side gibs are attached at the edges of the fixed and sliding plates, which close the edge and provide a mount for gib blocks with threaded adjustment screws. The adjustment screws press the gib blocks against the side of the sliding plate that does not face the fixed plate, so that a tightening of the adjustment screw presses the sliding plate to the fixed plate more firmly. In a similar manner, a loosening of the adjustment screw relaxes the pressure between the sliding plate and the fixed plate.

DETAILED DESCRIPTION OF THE INVENTION

OUTFEED ASSEMBLY

The present invention provides an improved outfeed gate apparatus for use with a waste processing system like that disclosed in U.S. Patent Application Publication Number 2006/0144980, which is incorporated herein by reference. The current invention comprises an outfeed gate apparatus with wear strips. Typically, the outfeed gate is part of an outfeed assembly, which is used to extract a plug or block of material from a supply at an elevated temperature, an elevated pressure, or both, and deposit the extracted block in a material exit apparatus at ambient conditions. In particular, the outfeed gate can be part of a system for processing waste, although the current invention is intended to include other uses independent of a waste processing system.

Figure 1:
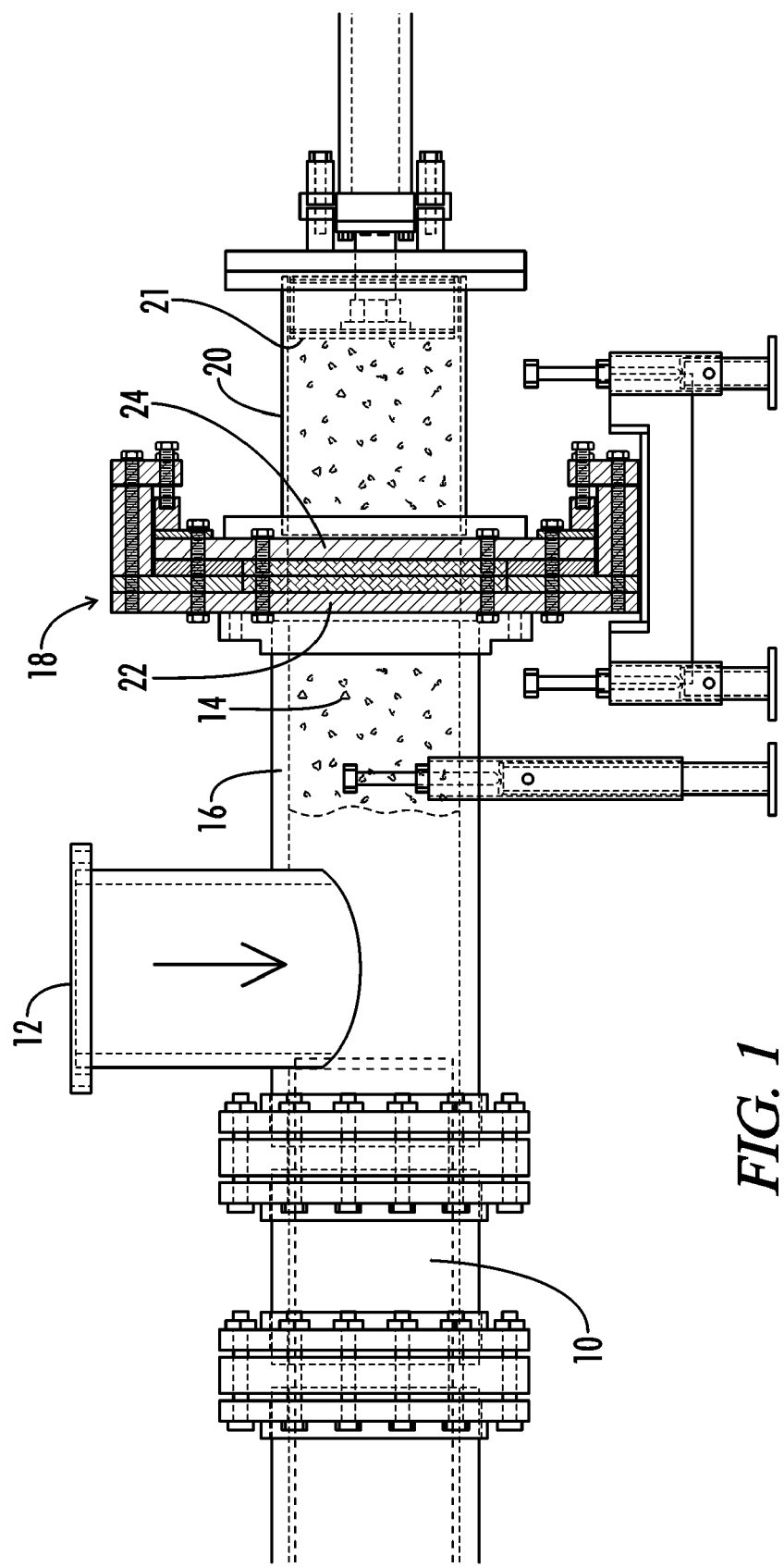
FIG. 1 is sectioned side view of the outfeed gate incorporated into an outfeed assembly.

The waste processing system includes an infeed assembly, a metamorphic processing apparatus (MPA), and an outfeed assembly. The MPA stirs the waste material at an elevated temperature, an elevated pressure, or both an elevated temperature and pressure, which converts the waste into a usable product. The product exiting the MPA is received by the outfeed system, which is depicted in FIG. 1. A compaction ram 10 compacts the material received from the inlet housing 12 into a plug 14 or a block 14. This compacted material is pushed from the compaction chamber 16 on the inlet side of the outfeed gate 18 to the block forming section 20 on the outlet side of the outfeed gate 18. The compaction ram 10 compacts the block 14 against a backup ram 21, which serves as a resilient backdrop for the formation of the block 14. The backup ram 21 slowly retracts as the block 14 is formed and pushed into the block forming section 20. When a compacted block is fully formed in the block forming section 20, the outfeed gate 18 cuts the block. The outfeed gate 18 then forms a seal between the compaction chamber 16, which is at elevated temperatures and/or pressures, and the block forming section 20, which is at ambient conditions.

As the block is cut, the block forming section 20 is moved to align with a discharge portion of the outfeed gate 18. To discharge the block 14 into the material exit apparatus, the backup ram 21 extends and pushes the block 14 out of the outfeed assembly. After the block 14 is discharged, the outfeed gate 18 is cycled again, and the block forming section 20 is re-aligned with the compaction chamber 16 of the supply system.

The steel in the outfeed gate 18 has to be capable of withstanding the impacts from the compaction ram 10 and the backup ram 21, so that a softer metal with more flexibility is required. We have discovered that harder more brittle metals can break or shatter under the conditions of the outfeed gate 18. However, hard steel is needed to cut the compacted block material and to prevent wear and grooves from the sliding action of the outfeed gate 18.

Outfeed Gate Operations

Figure 2:
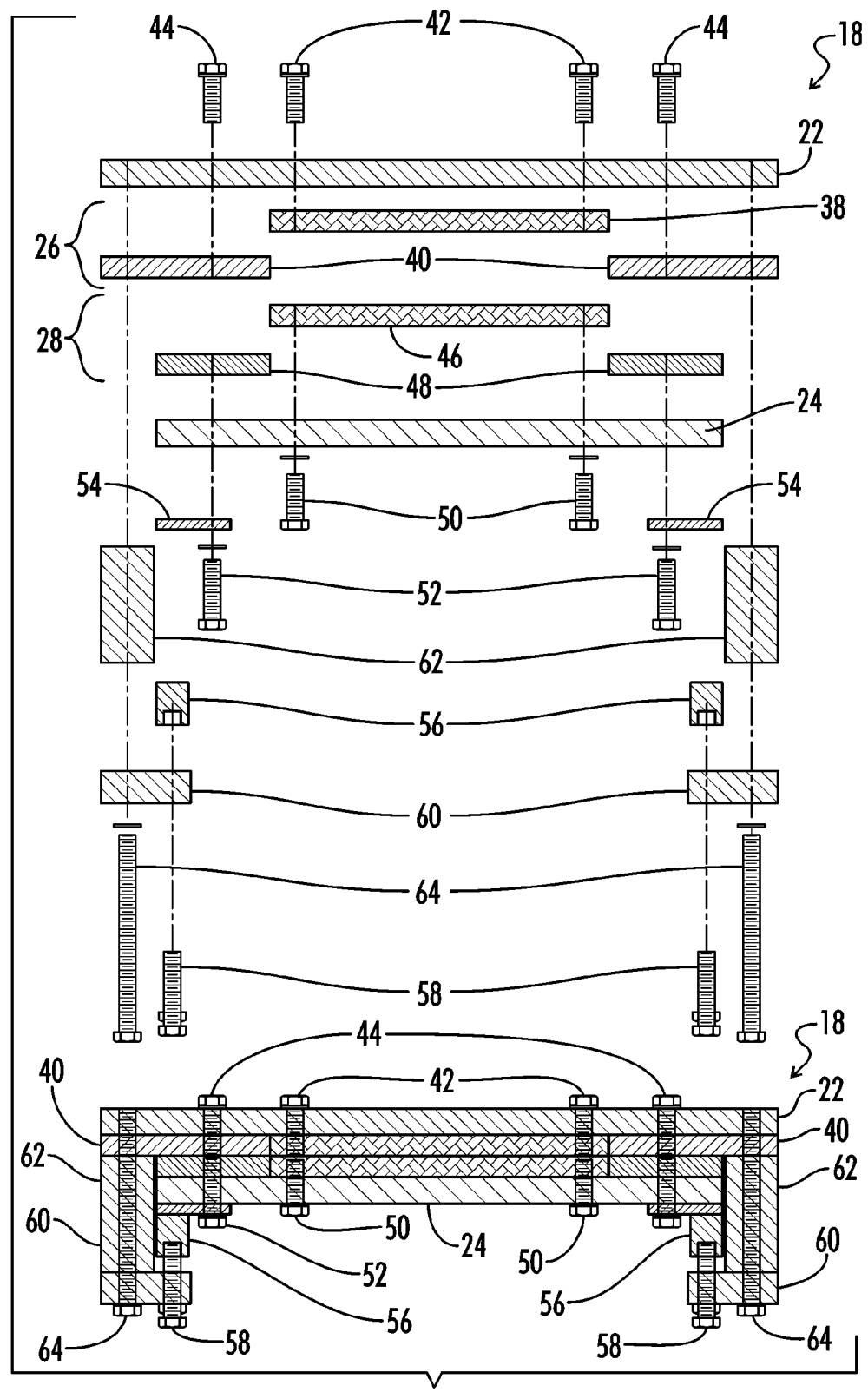
FIG. 2 presents an exploded side sectioned view of the outfeed gate and an assembled side sectioned view of the outfeed gate.

The outfeed gate 18 is comprised of a fixed plate 22, a sliding plate 24, and a wear strip 26, 28 for each plate, as depicted in FIG. 2. The fixed plate 22 is flat, and has an inlet hole 30 and an outlet hole 32 which are located side by side, and shown in FIG. 3. In the preferred embodiment, the holes or openings 30, 32 are round. The inlet hole 30 is aligned with the supply system, and the outlet hole 32 is aligned with the material exit apparatus. In the preferred embodiment, the supply system includes the compaction chamber 16, as is shown in FIG. 1. The material exit apparatus is not shown.

Figure 3:
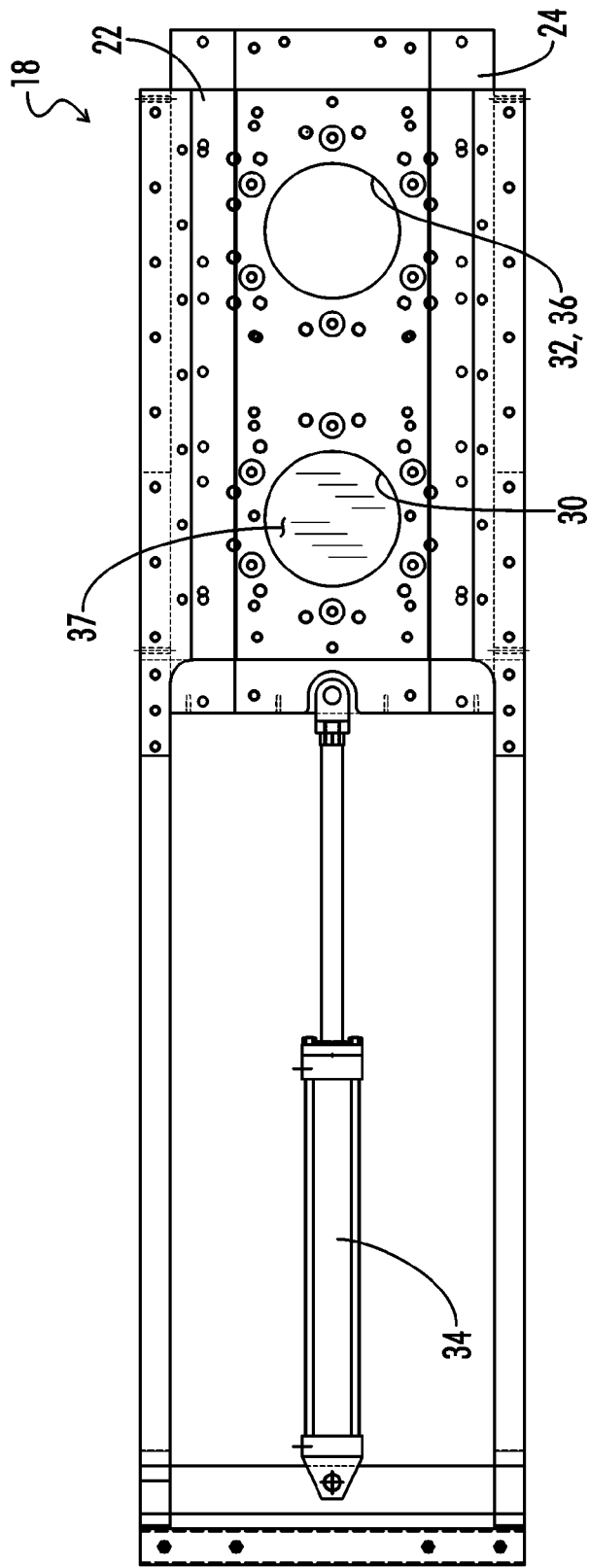
FIG. 3 is a frontal view of the outfeed gate.
Figure 4:
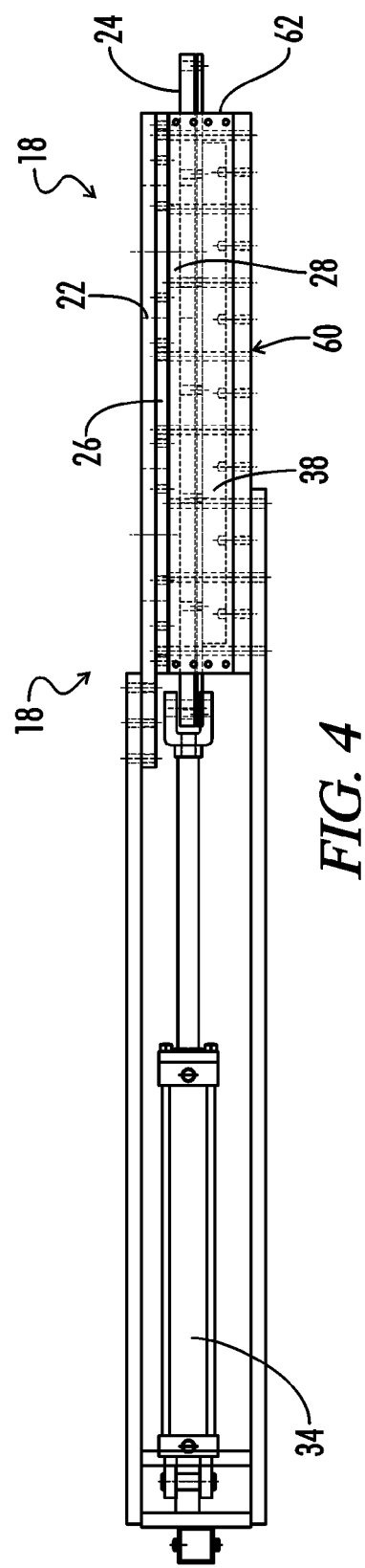
FIG. 4 is a top view of the outfeed gate.

A sliding plate 24 is parallel to the fixed plate 22, and is slid across the fixed plate 22 by a hydraulic cylinder 34, which can be seen in FIG. 4. The sliding plate 24 is flat with one hole or opening 36, and an adjacent surface 37 which is solid, as shown in FIG. 3. The fixed plate inlet and outlet holes 30, 32 and the sliding plate hole 36 are all of approximately the same size. The sliding plate 24 is slid between two positions, wherein the sliding plate hole 36 is aligned with either the fixed plate inlet hole 30 or the fixed plate outlet hole 32. When the sliding plate hole 36 is aligned with the fixed plate inlet hole 30, the outfeed system is receiving a block of product from the supply system, and when the sliding plate hole 36 is aligned with the outlet hole 32, the outfeed system is in position to eject the block of product to the material exit apparatus. When the sliding plate hole 36 is aligned with the fixed plate outlet hole 32, the solid portion of the sliding plate covers the fixed plate inlet hole 30, and forms a seal. Therefore, by moving or sliding the sliding plate hole 36 in registry with either the fixed plate inlet or outlet hole 30, 32, the flow of material can be selected to be either received or discharged from the block forming section 20.

Referring to FIG. 1, the compaction chamber 16 is at an elevated pressure and/or temperature. However the material exit apparatus (not shown) communicated with outlet hole 32 is at ambient conditions. Therefore, the seal between the fixed and sliding plates 22, 24 has to contain the pressures and temperatures of the compaction chamber 16 to prevent hazardous and wasteful discharges.

In the preferred embodiment, the material cut by the sliding plate 24 is a solid, which is under pressure, with pieces of rubbish intermixed therein. The sliding plate 24 has to be robust enough cut through this product, yet flexible enough to withstand the impacts from the compaction ram 10 which pressurizes the material in the compaction chamber 16, as well as impacts from the backup ram 21. The fixed plate 22 also has to be flexible enough to withstand impacts from both rams 10, 21. It is also preferable if the cutting edges of the sliding plate 24 have at least somewhat of a sharpened cutting surface, and not just a blunt edge, to facilitate the motion of the sliding plate 24 through the block material.

Wear Strip Assembly

As shown in FIG. 2, wear strips 26, 28 are attached to the facing surfaces of the fixed and sliding plates 22, 24. This extends the life and improves the performance of the outfeed gate 18. The first and second wear strips 26, 28, also referred to as first and second bearing strips 26, 28, engage each other and serve as the sliding material between the fixed and sliding plate 22, 24. The wear strips 26, 28 are made of a harder steel, so they are more capable of withstanding the abrasion and wear of the sliding action as the outfeed gate 18 is cycled. The fixed and sliding plates 22, 24 are constructed of a first steel which is softer than a second steel used in the construction of the wear strips 26, 28. Preferably, the first steel of the fixed and sliding plate 22, 24 is the softer P20 steel, and the second steel of the wear strips 26, 28 is the harder S7 steel. The fixed and sliding plates 22, 24 provide the flexibility to withstand the compressions from the supply system, and the wear strips 26, 28 provide the hardness needed to minimize wear and scraping from the sliding of the outfeed gate 18. If the wear strips 26, 28 are comprised of more than one part, the supporting fixed or sliding plate 22, 24 will be able to flex at the intersection line of the wear strip parts. Therefore, the fixed and sliding plates 22, 24 are used as supports for the wear strips 26, 28.

The harder wear strips 26, 28 are preferably used as the cutting edge for the sliding plate 24, so that an at least somewhat sharpened wear strip edge contacts the block material before the softer sliding plate 24 when the outfeed gate 18 is cycled. Furthermore, the wear strips 26, 28 can be chosen from materials that will reduce the friction caused by the sliding action during the cycling of the outfeed gate 18, or they can be coated with a material that will reduce the sliding friction. In either case, a friction reducing sliding material is between and engaging the fixed and sliding plates 22, 24. The wear strips 26, 28 are removable, so as they eventually wear down, they can be changed without replacing the entire outfeed gate 18. By replacing the wear strips 26, 28 instead of the fixed and sliding plates 22, 24, the maintenance costs and associated down time for the outfeed gate 18 are minimized. Also, the wear strips could be removed, re-coated with a friction reducing material, and re-installed as needed.

The wear strip connected to the fixed plate 22 is referred to as the first wear strip 26, and the wear strip connected to the sliding plate 24 is referred to as the second wear strip 28. The first and second wear strips 26, 28 are comprised of a plurality of first and second bearing strips, respectively. The primary purpose of the bearing strips is to protect the fixed and sliding plates 22, 24, so many different possible configurations of bearing strips are envisioned by the current invention.

In the preferred embodiment, the first wear strip 26 is comprised of three parts. The center portion of the fixed plate 22 is covered by the first central bearing strip 38. The first central bearing strip 38 has an inlet and an outlet hole which are in registry with the inlet and outlet holes of the fixed plate 30, 32, as shown in FIG. 3. Referring again to FIG. 2, the top and bottom portion of the fixed plate 22 are covered by upper and lower first peripheral bearing strips 40, wherein both the upper and lower first peripheral bearing strips are denoted by the same numeral 40. Although two first peripheral bearing strips 40 are described, more could be utilized, so that a plurality of first peripheral bearing strips 40 is envisioned. Preferentially, the first central bearing strip 38 and the first peripheral bearing strips 40 are rectangular in shape, and combine to cover essentially the entire surface of the fixed plate 22 which faces the sliding plate 24. Therefore, the first peripheral bearing strips 40 are adjacent to the first central bearing strip 38.

The first central bearing strip 38 is connected to the fixed plate 22 by a plurality of first central machine screws 42. The first central machine screws 42 pass through the fixed plate 22 and terminate in the first central bearing strip 38. Similarly, the first peripheral bearing strips 40 are connected to the fixed plate 22 by a plurality of first peripheral machine screws 44, which pass through the fixed plate 22 and terminate in the first peripheral bearing strips 40. The first peripheral bearing strips 38 are also connected to the fixed plate 22 by a plurality of gib machine screws, as will be described below.

The second wear strip 28 is similar to the first wear strip 26, except it is connected to the sliding plate 24 instead of the fixed plate 22. The different possible configurations, the rectangular shapes adjacent to each other, the preferred second central bearing strip 46 and the plurality or upper and lower second peripheral bearing strips 48 connected to the sliding plate 24 by a plurality of second central machine screws 50 and second peripheral machine screws 52 respectively is all as described for the first wear strip 26, with the following 3 exceptions.

1) The second peripheral machine screws pass through the first and second bearing plates 54 before passing through the sliding plate 24 and terminating in the second peripheral bearing strips 48.

2) The second central bearing strip 46 has one hole, which is in registry with the single sliding plate hole 36, as shown in FIG. 3.

3) The second peripheral bearing strips 48 are not connected to the sliding plate 24 by any gib machine screws 64, only by second peripheral machine screws 52, as shown in FIG. 2.

Biasing Assembly

The first and second wear strips 26, 28 have to be held tightly together so as to form a seal, as shown in FIG. 2. A biasing assembly, also called an engaging assembly, uses gibs to maintain the pressure necessary to form the needed seal, and to hold the outfeed gate 18 together. This pressure is used to bias the fixed and sliding plates 22, 24 together, so that the associated wear strips 26, 28 are engaged. First and second gib blocks 56 are used in conjunction with first and second threaded adjustment screws 58 to hold or bias the sliding plate 24 tightly against the fixed plate 22, with the wear strips 26, 28 in between. By tightening the adjustment screws 58, the sliding plate 24 is pressed more firmly into the fixed plate 22, and by loosening the adjustment screws 58, the pressure between the sliding plate 24 and the fixed plate 22 is relaxed. The threaded adjustment screws 58 utilize a nut locking system to prevent them from vibrating loose during operations of the outfeed gate or any other associated machinery.

The gib blocks 56 do not move with the sliding plate 24, so some wear at the point of engagement is to be expected. The surface of the sliding plate 24 which does not face the fixed plate 22 is protected from the wear caused by the gib blocks 56 by first and second bearing plates 54. The bearing plates 54 are connected to the sliding plate 24 by the second peripheral machine screws 52, as mentioned above. The bearing plates 54 are connected to the sliding plate 24 at a position where the gib blocks 56 engage the bearing plates 54. The bearing plates 54 are made of S7 steel, which is harder and more protective than the P20 steel used in the sliding plate 24.

For the gib blocks 56 and the threaded adjustment screws 58 to bias the fixed and sliding plates 22, 24 together, there must be support for the opposite, non-bearing surface of the gib blocks 56. This support is provided by the first and second gib flanges 60. The first and second threaded adjustment screws 58 are connected between the first and second gib flanges 60 and the first and second gib blocks 56, respectively, so the force of the biasing of the gib blocks 56 against the bearing plates 54 can be adjusted. The first and second gib blocks 56 are supported by being connected to the first and second gib flanges 60, respectively, which in turn receive support and are connected to the first and second side gibs 62, respectively. The side gibs 62 are adjacent to the gib blocks 56, and are in turn supported by being attached to the fixed plate 22 by a plurality of gib machine screws 64. The gib machine screws 64 pass through the gib flange 60, then the side gib 62, then the first peripheral bearing strips 40, and finally terminate in the fixed plate 22, so that the gib flange 60, side gib 62, first peripheral bearing strip 40, and the fixed plate 22 are all connected. The gib machine screws 64 serve to connect the entire biasing assembly to the fixed plate, so that the biasing assembly is supported.

The side gibs 62 provide a top and bottom closure for the outfeed gate 18 as a whole, so that the sliding plate 24 operates between and adjacent to the side gibs 62. Referring to the top view of the outfeed gate 18 depicted in FIG. 4, it can be seen that the side gibs 62 and the gib flanges 60 run the length of the wear strips 26, 28, so as to close the entire top and bottom of the outfeed gate assembly 18.

The side gibs 62 and the gib blocks 56 are preferentially made of A-2 steel. A-2 steel has good all around performance, low cost, wide availability, and is relatively easy to fabricate to the desired shape.

Thus, although there have been described particular embodiments of the present invention of a new and useful OUTFEED GATE WITH WEAR STRIP ASSEMBLY, it is not intended that such references be construed as limitations upon the scope of this invention except as set forth in the following claims.

What is claimed is:

1. An outfeed gate apparatus comprising:
a fixed plate having an inlet and an outlet defined therein;
a sliding plate, having a hole defined therein, said sliding plate movable between a position in which said hole registers with said inlet and a position in which said hole registers with said outlet for selecting the flow of material;
a first wear strip attached to said fixed plate; and a second wear strip attached to said sliding plate and engaging said first wear strip.

2. The outfeed gate apparatus of claim 1, further comprising an adjustable biasing assembly connected to said fixed plate for biasing said sliding plate toward said fixed plate.

3. An outfeed gate apparatus comprising:
a fixed plate having an inlet and an outlet defined therein;
a sliding plate, having a hole defined therein, said sliding plate movable between a position in which said hole registers with said inlet and a position in which said hole registers with said outlet for selecting the flow of material; and
a sliding material located between and engaging said fixed plate and said sliding plate for reducing friction; and
a biasing assembly connected to said fixed plate for biasing said sliding plate toward said fixed plate, said biasing assembly comprising:
a first side gib attached to said fixed plate and adjacent to said sliding plate;
a first bearing plate attached to said sliding plate;
a first gib block engaging said bearing plate and adjacent to said first side gib;
a first gib flange connected to said first side gib;
a first threaded adjustment screw connected between said first gib flange and the first gib block for adjusting a force of the first gib block against the first bearing plate;
a second side gib attached to said fixed plate and adjacent to said sliding plate;
a second bearing plate attached to said sliding plate;
a second gib block engaging said second bearing plate and adjacent to said second side gib;
a second gib flange connected to said second side gib; and
a second threaded adjustment screw connected between said second gib flange and the second gib block for adjusting a force of the second gib block against the second bearing plate.

4. An outfeed gate apparatus comprising:
a fixed plate having an inlet and an outlet defined therein;
a sliding plate, having a hole defined therein, said sliding plate movable between a position in which said hole registers with said inlet and a position in which said hole registers with said outlet for selecting the flow of material; and
a sliding material located between and engaging said fixed plate and said sliding plate for reducing friction, wherein said sliding material comprises:
a plurality of first bearing strips attached to said fixed plate; and
a plurality of second bearing strips attached to said sliding plate and engaging said plurality of first bearing strips.

5. The outfeed gate apparatus of claim 4, wherein the plurality of first bearing strips comprises:
a first central bearing strip, having a rectangular shape and having an inlet hole and an outlet hole, said inlet hole and said outlet hole in registry with said inlet and outlet of said fixed plate, connected to said fixed plate; and
an upper first peripheral bearing strip and a lower first peripheral bearing strip, adjacent to said first central bearing strip and having a rectangular shape, connected between said fixed plate and said side gibs.

6. The outfeed gate apparatus of claim 4, wherein the plurality of second bearing strips comprises:
a second central bearing strip, having a rectangular shape and having an opening in registry with the hole defined in the sliding plate, said second central bearing strip connected to said sliding plate;
an upper second peripheral bearing strip adjacent to said second central bearing strip and having a rectangular shape, connected to said sliding plate; and
a lower second peripheral bearing strip adjacent to said second central bearing strip and having a rectangular shape, connected to said sliding plate.

7. The outfeed gate apparatus of claim 4, wherein the plurality of first bearing strips comprises:
a first central bearing strip connected to said fixed plate by a plurality of first central machine screws, which pass through said fixed plate and terminate in said first central bearing strip; and
a plurality of first peripheral bearing strips adjacent to said first central bearing strip, and connected to said fixed plate by a plurality of gib machine screws which pass through said gib flanges, said side gibs, said plurality of first peripheral bearing strips, and terminate in said fixed plate, and a plurality of first peripheral machine screws which pass through said fixed plate terminating in said plurality of first peripheral bearing strips.

8. The outfeed gate apparatus of claim 4, wherein the plurality of second bearing strips comprises:
a second central bearing strip connected to said sliding plate by a plurality of second central machine screws, which pass through said sliding plate and terminate in said second central bearing strip; and
a plurality of second peripheral bearing strips adjacent to said second central bearing strip, and connected to said sliding plate by a plurality of second peripheral machine screws which pass through said bearing plates, said sliding plate, and terminate in said plurality of second peripheral bearing strips.

9. The outfeed gate apparatus of claim 4, wherein:
the fixed plate and the sliding plate are constructed of a softer steel material; and
the plurality of first bearing strips and the plurality of second bearing strips are constructed of a harder steel material, said harder steel material being harder than the softer steel material.

10. The outfeed gate apparatus of claim 9, wherein the softer steel material comprises P20 steel and the harder steel material comprises S7 steel.

11. An outfeed gate apparatus comprising:
a fixed plate having an inlet and an outlet defined therein;
a sliding plate parallel to said fixed plate the sliding plate having a hole defined therein, said sliding plate movable between a position in which the hole registers with the inlet and a position in which said hole registers with the outlet for selecting the flow of material;
a first wear strip attached to said fixed plate; and
a second wear strip attached to said sliding plate and engaging said first wear strip.

12. The outfeed gate apparatus of claim 11, wherein the first wear strip comprises:
a first central bearing strip, having a rectangular shape, connected to said fixed plate by a plurality of first central machine screws; and
a plurality of first peripheral bearing strips, adjacent to said first central bearing strip and having a rectangular shape, said plurality of first peripheral bearing strips connected to said fixed plate by a plurality of first peripheral machine screws.

13. The outfeed gate apparatus of claim 11, wherein the second wear strip comprises:
   a second central bearing strip, having a rectangular shape, connected to said sliding plate by a plurality of second central machine screws; and
   a plurality of second peripheral bearing strips adjacent to said second central bearing strip and having a rectangular shape, said plurality of second peripheral bearing strips connected to said sliding plate by a plurality of second peripheral machine screws.

14. The outfeed gate apparatus of claim 11, wherein the first wear strip comprises a steel material harder than a steel material of the fixed plate.

15. The outfeed gate apparatus of claim 14, wherein the second wear strip comprises a steel material harder than a steel material of the sliding plate.

16. An outfeed gate apparatus comprising:
   a fixed plate having an inlet opening and an outlet opening therein;
   a sliding plate having an opening therein, said sliding plate movable between registry of said opening in said sliding plate with said inlet opening and said outlet opening of said fixed plate, said sliding plate and said fixed plate being comprised of a first steel material;
   a plurality of first bearing strips connected to said fixed plate;
   a plurality of second bearing strips connected to said sliding plate, said plurality of first bearing strips and said plurality of second bearing strips being comprised of a second steel material harder than said first steel material; and
   an engaging assembly connected to said fixed plate for engaging said plurality of first bearing strips with said plurality of second bearing strips.

17. The outfeed gate apparatus of claim 16, wherein the plurality of first bearing strips comprises:
   a first central bearing strip, having a rectangular shape, connected to said fixed plate by a plurality of first central machine screws; and
   a plurality of first peripheral bearing strips, adjacent to said first central bearing strip and having a rectangular shape, connected to said fixed plate by a plurality of first peripheral machine screws.

18. The outfeed gate apparatus of claim 16, wherein the plurality of second bearing strips comprises:
   a second central bearing strip, having a rectangular shape, connected to said sliding plate by a plurality of second central machine screws; and
   a plurality of second peripheral bearing strips adjacent to said second central bearing strip and having a rectangular shape, connected to said sliding plate by a plurality of second peripheral machine screws.

19. The outfeed gate apparatus of claim 16, wherein said second steel material of said plurality of first bearing strips and said plurality of second bearing strips comprises S7 steel.

20. The outfeed gate apparatus of claim 19, wherein the first steel material of the fixed plate and the sliding plate comprises P20 steel.

* * * * *